United States Patent
Pichot

(10) Patent No.: US 9,823,367 B2
(45) Date of Patent: Nov. 21, 2017

(54) SEISMIC SHOOTING WITH MAMMAL MITIGATION SYSTEM AND METHOD

(71) Applicant: Sercel, Carquefou (FR)

(72) Inventor: Yann Pichot, Nantes (FR)

(73) Assignee: SERCEL, Carquefou (FR)

( * ) Notice: Subject to any disclaimer, the term of this patent is extended or adjusted under 35 U.S.C. 154(b) by 254 days.

(21) Appl. No.: 14/740,435

(22) Filed: Jun. 16, 2015

(65) Prior Publication Data

US 2016/0370485 A1   Dec. 22, 2016

(51) Int. Cl.
G01V 1/38 (2006.01)
G01V 1/30 (2006.01)
G01V 1/00 (2006.01)

(52) U.S. Cl.
CPC .................................. *G01V 1/001* (2013.01)

(58) Field of Classification Search
CPC ........ G01V 1/001; G01V 1/3808; G01V 1/30; G01S 5/22; G01S 5/26; G01S 5/28
See application file for complete search history.

(56) References Cited

U.S. PATENT DOCUMENTS

| | | | |
|---|---|---|---|
| 7,974,151 B2 | 7/2011 | Iranpour et al. | |
| 8,937,847 B2 | 1/2015 | Ayela et al. | |
| 9,470,775 B1* | 10/2016 | Baggenstoss | G01S 5/20 |
| 2010/0290316 A1* | 11/2010 | Caudal | G01S 5/22 |
| | | | 367/127 |
| 2012/0069702 A1* | 3/2012 | Muyzert | G01V 1/3808 |
| | | | 367/15 |
| 2012/0120760 A1* | 5/2012 | Groenaas (Gronaas) | G01V 1/001 |
| | | | 367/20 |
| 2014/0192617 A1 | 7/2014 | Ayela et al. | |
| 2014/0293749 A1 | 10/2014 | Gervaise | |
| 2016/0131783 A1* | 5/2016 | Sallas | G01V 1/36 |
| | | | 367/21 |
| 2016/0370485 A1* | 12/2016 | Pichot | G01V 1/001 |

OTHER PUBLICATIONS

H.S.G. Groenaas et al., "A Novel Marine Mammal Monitoring System Utilizing the Seismic Streamer Spread", 73rd EAGE Conference & Exhibition incorporating SPE EUROPEC 2011, Vienna, Austria, May 23-26, 2011.
S. Mumford, "Practical Use of Passive Acoustic Monitoring Systems for Marine Mammal Mitigation", Poster for Gardline Environmental, downloaded from the internet on Sep. 25, 2013 (http://www.gardlinemarinesciences.com/assets/cms_page_media/2013/9/25/Mumford,%220Cark,%20Robinson%202008.pdf).

* cited by examiner

*Primary Examiner* — Daniel Pihulic
(74) *Attorney, Agent, or Firm* — Patent Portfolio Builders PLLC

(57) ABSTRACT

A system and method for detecting marine mammals and mitigating sound effects on them. The mammal detecting and mitigating system includes a first mammal monitoring system and a second mammal monitoring system. The first and second mammal monitoring systems are configured to be deployed away from each other, and the first and second monitoring systems communicate to each other such that the first mammal monitoring system is informed about a presence of a marine mammal detected by the second mammal monitoring system.

19 Claims, 13 Drawing Sheets

SEISMIC SHOOTING WITH MAMMAL MITIGATION SYSTEM AND METHOD

BACKGROUND

Technical Field

Embodiments of the subject matter disclosed herein generally relate to methods and systems for making a seismic survey and, more particularly, to mechanisms and techniques for detecting the presence of marine mammals and mitigating their exposure to undesired sound levels generated by a seismic source.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

For marine acquisition, a seismic acquisition system 100 includes, as illustrated in FIG. 1, a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 (also known as birds) are attached along the streamer and controlled by a controller 126 for adjusting a position of the streamer according to a survey plan.

Source array 130 has plural source elements 136, which are typically air guns. The source elements are attached to a float 137 to travel at desired depths below the water surface 104. The source elements attached to float 137 form a sub-array. Source array 130 may have multiple sub-arrays, typically 3. Traditionally, vessel 102 tows two source arrays 130 and 130', which may be identical. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

When a conventional marine source (e.g., air gun) is fired, it generates a powerful underwater air bubble that oscillates for a couple of seconds, thus generating sound waves. These waves propagate through the water toward the ocean bottom as illustrated in FIG. 1. However, some of the energy associated with this bubble propagates as a sound wave 150, substantially parallel to the water surface 104, with the potential of interfering with activities of a marine mammal 152. To prevent this kind of situations, the seismic surveys are regulated by various national and international bodies that require that marine mammal activity is monitored and protected from harmful sound waves.

More specifically, international and national regulations in this regard and the recommendations of competent bodies encourage marine seismic operators to carry out, in parallel to their measurement campaign, continuous monitoring for detecting the possible presence of marine mammals in the exploration zone.

This monitoring is currently carried out either visually by one or more human operators and/or using an independent system of acoustic receiver or receivers fulfilling functions of passive detection, classification and geographical location of the marine mammal or mammals. In this regard, U.S. Pat. Nos. 7,974,151 and 8,937,847, the entire content of which is incorporated herein by reference, disclose such mammals detection systems. Once a marine mammal is detected within an exclusion zone centered on the seismic source, current regulations require that the seismic source is stopped.

These acoustic systems 160, commonly referred to as Passive Acoustic Monitoring (PAM), are also towed by the streamer vessel 102 as illustrated in FIG. 1. PAM system 160, which is shown in FIG. 2 in more detail, includes acoustic receivers 122' distributed along one or more antennas 110' dedicated to this function. A telemetry system (not shown) transmits the data recorded by sensors 122' to a remote controller (i.e., processing unit) 126, located for example on the seismic vessel. Alternatively, mammal sensors 122' may be integrated with seismic sensors 122 into the same streamer 110 as shown in FIG. 2. In still another embodiment, mammal sensors 122' may be integrated into seismic sensors 122, i.e., the same sensor is used for both seismic activity and mammal detection functions as also shown in FIG. 2. In other words, the existing PAM systems are deployed together with in parallel to the seismic streamers.

A PAM system may also include equipment for "acoustic deterring" of marine mammals. This equipment emits artificial acoustic signals in order to drive away mammals before the implementation of activities assumed to be dangerous for these species. Such equipment is described in U.S. Pat. No. 8,937,847.

When a mammal is detected by the PAM system, current practices involve stopping the firing of the seismic source until the mammal has left the so called exclusion zone. The exclusion zone is a volume (typically a sphere) centered on the seismic source and having a given radius. The presence of a marine mammal inside the exclusion zone is considered to be dangerous for the mammal, and for this reason, the firing of the source is stopped when the mammal is detected inside the exclusion zone.

However, such a practice has the following possible disadvantages: it does not guarantee that a marine mammal is protected from the sound waves associated with the seismic source, slows down the data acquisition, which increases the costs of the survey, and requires quick human intervention. Besides, the existing systems are not pro-active, i.e., they do not anticipate the mammals' presence, rather they are reactive, i.e., they detect the mammals' presence only when the mammals are so close to the acquisition system that not many choices are left for the vessel's operator. This needs highly competent/qualified technicians for quickly and adequately reacting to the detected mammal.

Therefore, there is a need to improve or come up with a new PAM system that avoids the above noted disadvantages, and especially protects the marine mammals.

SUMMARY OF THE INVENTION

According to an embodiment, there is a system for mitigating marine mammals exposure to sound waves. The mammal detecting and mitigating system includes a first mammal monitoring system and a second mammal monitoring system. The first and second mammal monitoring systems are configured to be deployed away from each other, and the first and second monitoring systems communicate to each other such that the first mammal monitoring system is informed about a presence of a marine mammal detected by the second mammal monitoring system.

According to another embodiment, there is a seismic acquisition system with mammal detecting and mitigating capabilities. The system includes a first vessel that tows a seismic source, plural seismic streamers, and a first mammal monitoring system, and a second vessel that tows a second mammal monitoring system. The first vessel advances along a pre-plot path P, the second vessel is offset by a predetermined distance along the pre-plot P, and the first vessel controls a path of the second vessel when a mammal is detected by the second mammal monitoring system.

According to still another embodiment, there is a method for mammal detection and mitigation. The method includes a step of deploying first and second mammal monitoring systems with a given offset; a step of detecting a presence of a marine mammal with the second mammal monitoring system, a step of transmitting information related to the marine mammal, from the second mammal monitoring system to the first mammal monitoring system, and a step of deciding, at a first vessel that hosts the first mammal monitoring system, to deviate or not from a given pre-plot path P to a new path P' to mitigate sound effects on the marine mammal.

According to still another exemplary embodiment, there is a computer readable medium including computer executable instructions, wherein the instructions, when executed by a processor, implement instructions for mitigating marine mammals exposure to sound waves. The instructions implement the method steps discussed above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a dual PAM system that uses an additional vessel for the second PAM system. However, the embodiments to be discussed next are not limited to a seismic survey system having two vessels.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a seismic acquisition system with mammal detecting and mitigating capabilities. The system includes a first vessel that tows a seismic source, plural seismic streamers, and a first mammal monitoring system. Additionally, the system includes a second vessel that tows a second mammal monitoring system. The first vessel advances along a pre-plot path P, and the second vessel is offset by a predetermined distance along the pre-plot P.

As discussed in the background section, a traditional PAM system is implemented on the vessel that tows the streamers and the seismic source. The fact that the PAM system is mounted so close to the seismic source limits the possible responses of the vessel, because by the time the mammal has been detected, the seismic source is so close to the mammal that the only practical response is to stop firing the seismic source. Note that a conventional seismic vessel is so large and heavy that is needs couple of miles to change its path to avoid the mammal, which is not practical due to the short lead time.

Figure 1:
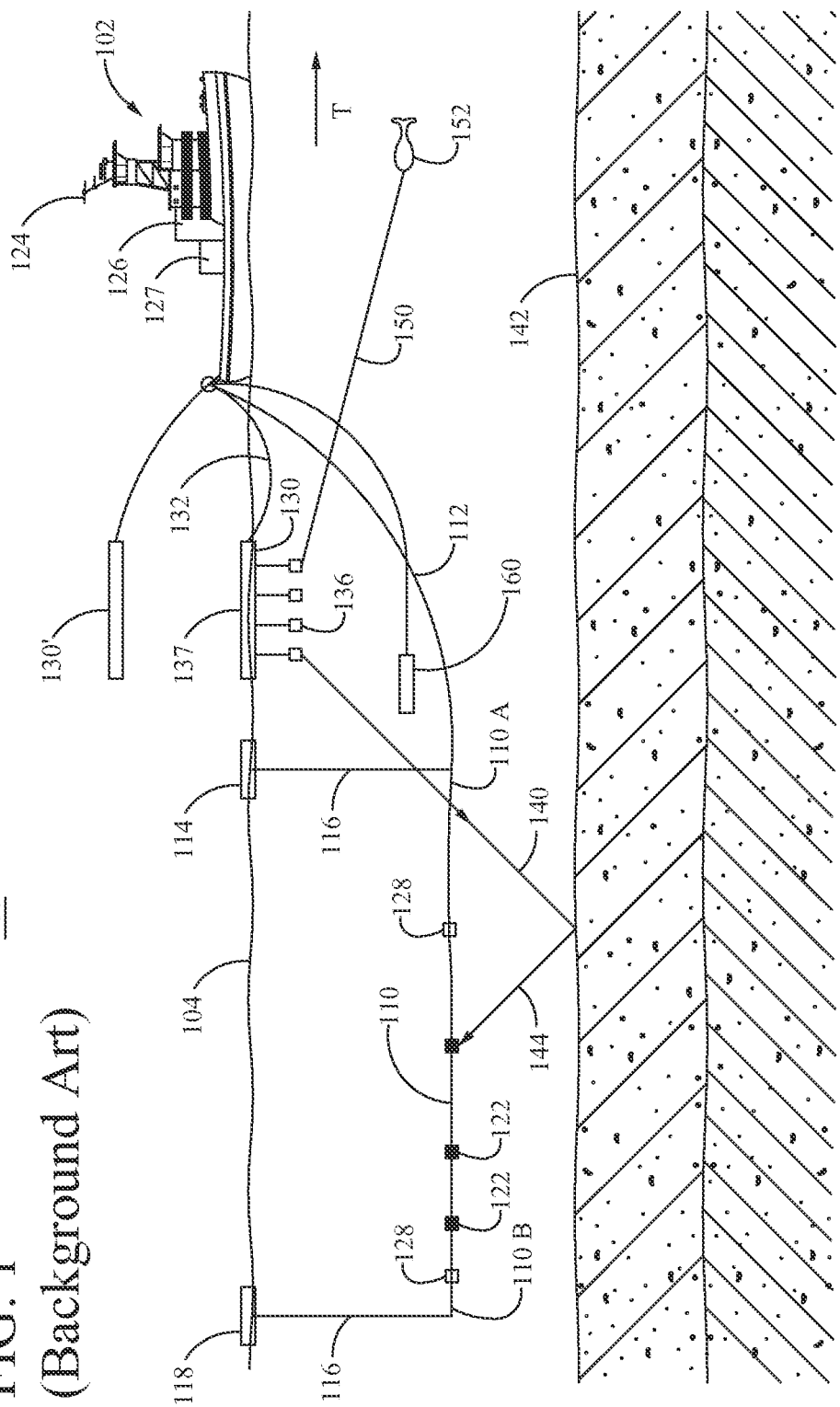
FIG. 1 illustrates a marine seismic survey system.
Figure 2:
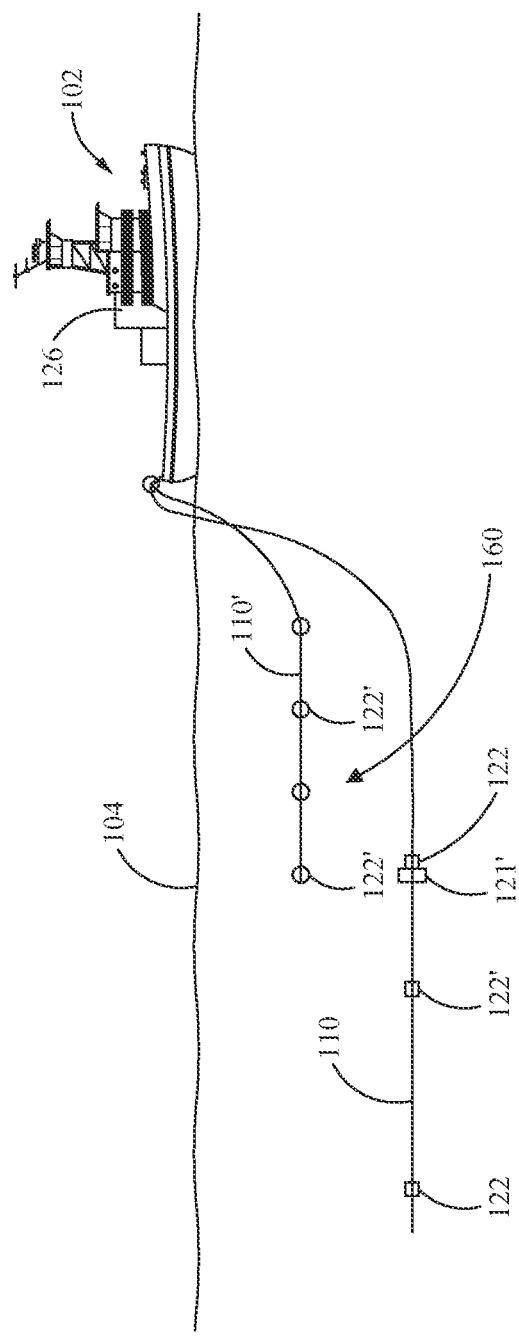
FIG. 2 illustrates a traditional PAM system.
Figure 3:
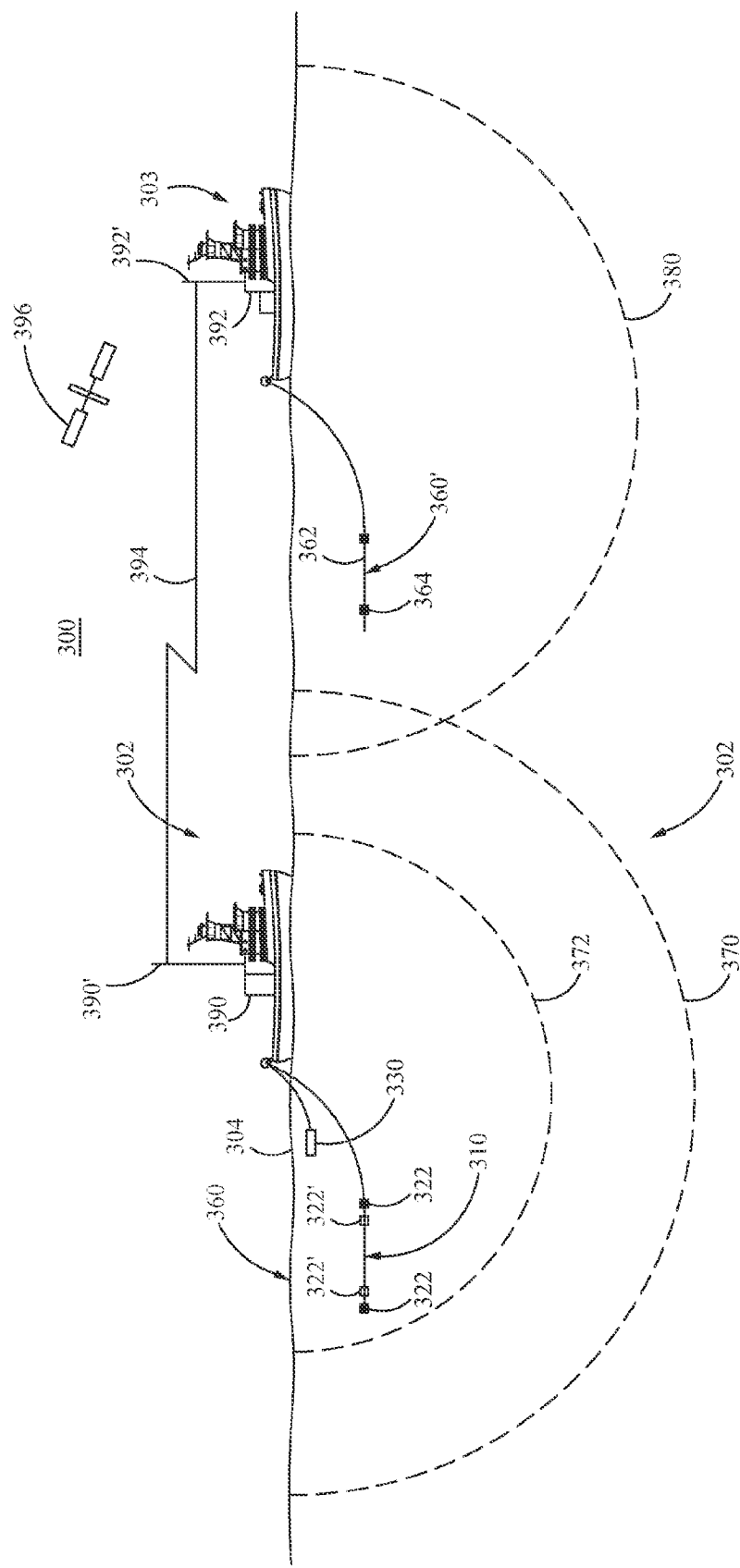
FIG. 3 illustrates a novel marine seismic survey system having two PAM systems.

According to an embodiment illustrated in FIG. 3, a seismic survey system 300 includes, in addition to the main vessel 302 that tows source 330, streamers 310, and first PAM system 360, a secondary vessel 303, that tows its own second PAM system 360'. First PAM system 360 includes sensors 322' either attached to streamers 310, or attached to an antenna (not shown) as in FIG. 2. Second PAM system 360' includes one or more antennas 362 and one or more sensors 364. Those skilled in the art would understand that a PAM antenna 362 is much shorter and lighter than a seismic streamer 310, which is used for recording seismic data. For this reason, second vessel 303 may be a light boat (e.g., a chasing boat that is too light to tow seismic streamers or a seismic source), and not a large vessel as is a traditional streamer vessel 302. Thus, in one application, PAM antennas 362 are shorter than seismic streamers 310 and second vessel 303 is lighter and faster than first vessel 302.

FIG. 3 also shows that each vessel has its own detection range, i.e., the volume of water around the vessel for which the PAM system can accurately detect a marine mammal. In this regard, FIG. 3 shows first vessel 302 having a detection range 370 while second vessel 303 has a detection range 380. In addition, first vessel 302 has an exclusion zone 372. Note that second vessel 303 does not have an exclusion zone because no seismic source is towed by this vessel. However, in one embodiment, as discussed later, the second vessel can have its own seismic source and/or seismic streamers. In that case, the second vessel would have its own exclusion zone.

Each of the PAM systems is connected through a telemetry system to a corresponding controller. FIG. 3 shows PAM system 360 being connected to controller 390 and PAM system 360' being connected to controller 392. A possible configuration of controllers 390 and 392 is discussed later. At a minimum, a controller includes a processing element, a memory, and circuitry for receiving and sending signals. The controllers may be connected to the navigation system of each vessel for receiving navigation details of the vessels, e.g., position (from GPS system), speed, direction, pre-plot path details, etc. Controller 390 may be connected to a transmitter 390' while controller 392 may be connected to a corresponding transmitter 392'. Transmitters 390' and 392' are configured to communicate with each other in a wireless way through a direct channel 394, or through a satellite or aircraft 396. In this way, information detected by second PAM system 360' may be shared with first PAM system 360 and implicitly with the navigation system of the first vessel for allowing the first vessel to take other mitigating actions then simply not shooting the seismic source.

Figure 4A:
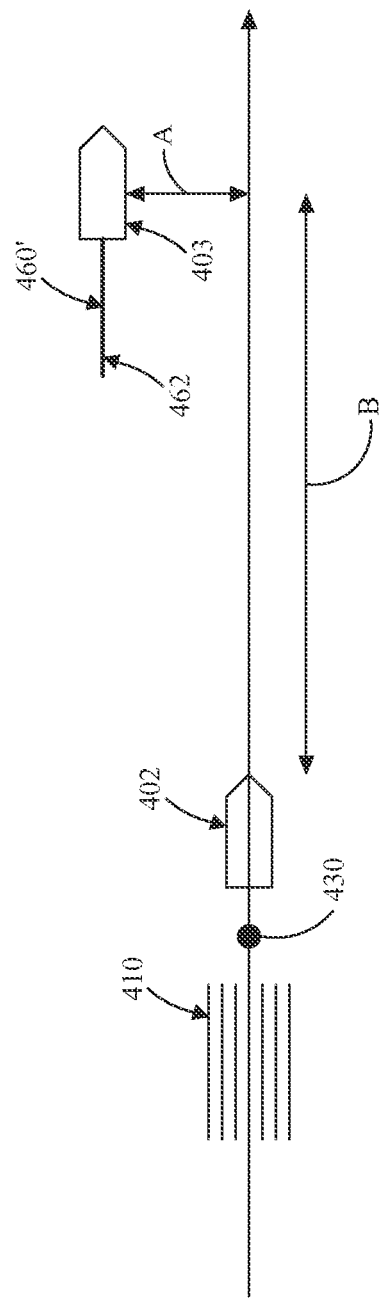
FIGS. 4A and 4B illustrate various locations of the two PAM systems relative to each other.
Figure 4B:
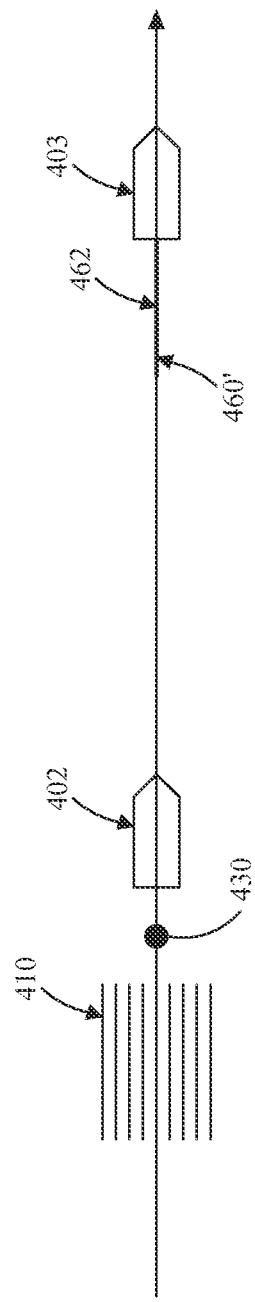

The two vessels shown in FIG. 3 may be distributed in various configurations relative to a pre-plot path P, as illustrated in FIGS. 4A-B. Seismic acquisition 400 is shown in FIG. 4A having the first vessel 402 following the pre-plot path P while the second vessel 403 is offset by a distance A, along a cross-line direction, from path P. Also, second vessel 403 is shown with an offset along the inline direction, by a distance B, ahead of the first vessel 402. FIG. 4B shows another embodiment with no cross-line offset between the two vessels. Those skilled in the art would understand that the second vessel may have any other position relative to the first vessel, e.g., behind the first vessel on the side of streamers 410, etc. Also, in one embodiment, it is possible to have multiple second vessels distributed around the first vessel. However, a preferred location of the second vessel is ahead of the first vessel along the inline direction for the reasons which are now explained.

Figure 5A:
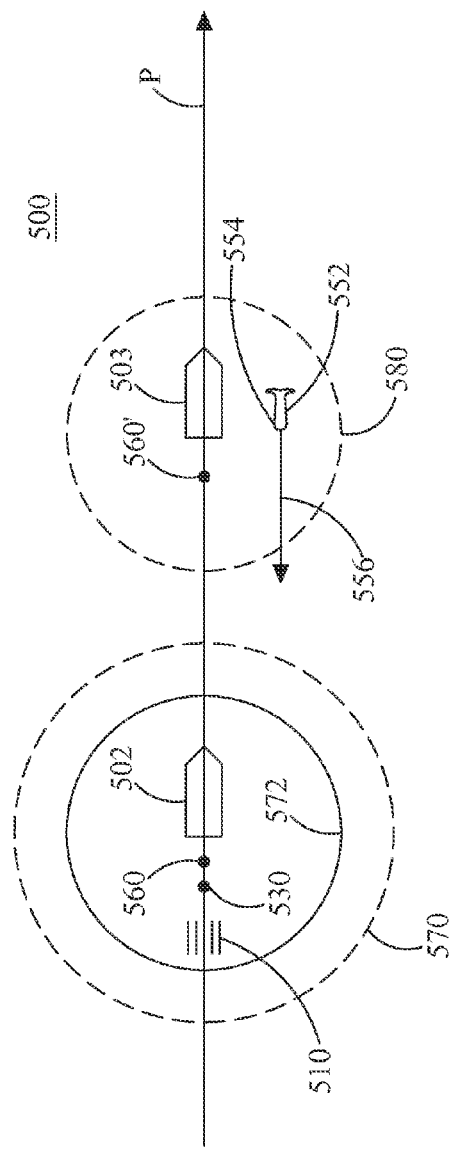
FIGS. 5A-C illustrate how the second PAM system monitors and follows a marine mammal.

According to an embodiment illustrated in FIG. 5A, a seismic acquisition system 500 includes a first vessel 502 that tows a seismic source 530 and plural seismic streamers 510. First vessel 502 also includes a first PAM system 560 that is schematically illustrated in the figure. A second vessel 503 tows a second PAM system 560' and moves ahead of the first vessel, with a given offset along the inline direction. The given offset may be so large that the first vessel would need about one hour to arrive at the second vessel if the second vessel would be stationary. In one application, the offset is between 1 and 20 nautical miles. In another application, the offset is at least 2 miles. In other embodiments, the inline offset varies between couple of minutes to couple of hours. An optimal inline offset may be determined based on the experience of the operator, the type of survey, the length of the streamers, the power of seismic sources, and the frequency of marine mammal's occurrence in the surveyed area.

Suppose that a marine mammal 552 is detected by the second PAM system 560', within the detection range 580. Second PAM system 560' transmits the data associated with the mammal to corresponding controller on vessel 503, to calculate the location 554 of the mammal, and its likely trajectory 556. Additionally, second PAM system 560' may identify the type of mammal based on the collected data and a data base of stored mammals' sound signatures. This information is then transmitted to first vessel 502, either directly to the controller associated with the first PAM system 560, or to the navigation system of the first vessel.

Based on the calculated mammal's trajectory 556 received from the second vessel, the first vessel's navigation system or operator makes a decision whether to change its path or not to move the exclusion zone 572 from intersecting the mammal's trajectory 556. This decision process is discussed later.

After the second vessel has detected mammal 552 inside its detection range 580, the navigation system of the second vessel, which may also be housed by controller 392 in FIG. 3, makes the decision that the second vessel should follow the mammal for monitoring its trajectory 556 and determining any change in that trajectory. Note that if mammal 552 changes its trajectory 556 to move away from the first vessel and its exclusion zone 572, the second vessel transmits this information to the first vessel and the first vessel may decide to not change its path as the mammal is moving away. This output is highly desirable because a non-negligible cost is associated with changing the first vessel's path while the cost involved with changing second vessel's path is minimal.

Figure 5B:
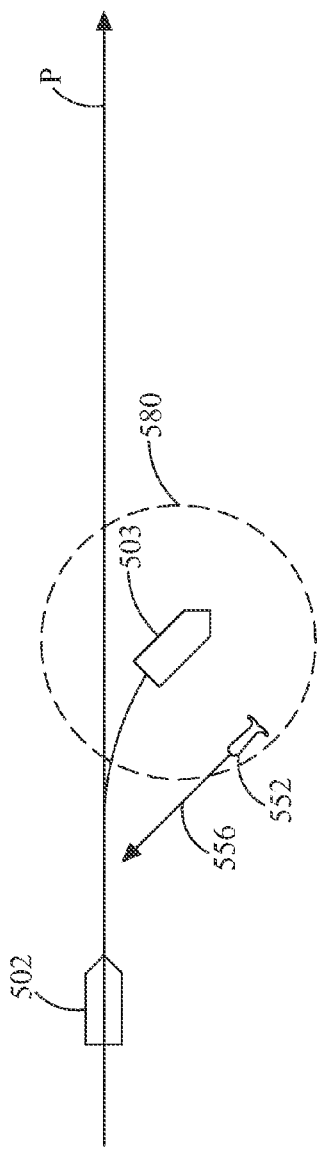

Thus, as illustrated in FIG. 5B, the second vessel is shown deviating from its initial path to follow the marine mammal. The amount of deviation from the initial path depends on the mammal's trajectory. For example, in one embodiment, the second vessel deviates from its original path as long as mammal 552 is outside detection range 570 of the first vessel. Once the mammal 552 enters the detection range 570 of the first vessel, the second vessel increases its speed and reposition itself in front of the first vessel, on the given path P, at the predetermined distance B. To be able to reposition itself in a short amount of time, the second vessel may be selected to be much faster and lighter than the first vessel. In another embodiment, the second vessel follows the marine mammal for a predetermined time or distance after which it falls back to its original trajectory. The predetermined distance may be between one mile and half the offset B. The predetermined time may be less than half the time lag of the first vessel relative to the second vessel.

Figure 5C:
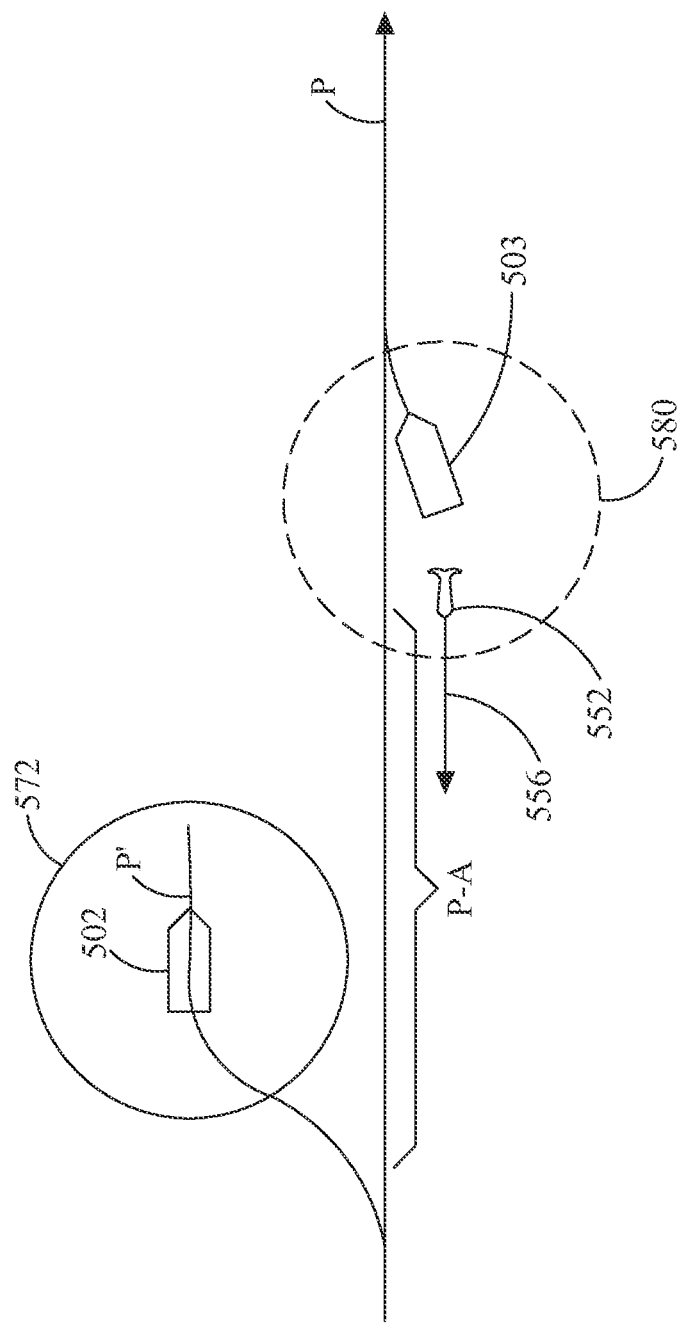

The wireless communication between the controllers associated with the two PAM systems continuously updates the first vessel's navigation system or another decision making element regarding the current position of the mammal and its current predicted trajectory. When the predicted/estimated trajectory intersects the exclusion zone of the first vessel and it is highly likely that the mammal will not change its trajectory, a decision may be made at the first vessel to deviate from its given pre-plot path P so that the exclusion zone 572 is shifted away from the mammal. The new path P' may be one parallel to the given path P, as illustrated in FIG. 5C. Note that the seismic source of the first vessel is not stopped at any time, i.e., it continues to shoot for generating sound waves because the new path will move the exclusion zone away from the mammal. In this way, the mammal is protected and the seismic survey is not negatively impacted as in the case of a seismic system with a single PAM system. Also, the fact that the first vessel is aware with up to an hour before encountering the mammal, makes it possible to change the path of the first vessel in a meaningful way for the seismic survey and for the mammal.

The new path P' may be either an already surveyed path or a future to be surveyed path. Those skilled in the art know that a vessel usually follows parallel paths (note that there are instances when a curved path may be followed by the vessel, in which case the embodiments disclosed here also apply) that are offset with a given distance for covering the entire survey area. Thus, by changing the path of the first vessel to an existing one of the survey, which is possible because of the lead time provided by the second vessel, loss of seismic data may be minimal as the missed part P-A of path P may be later surveyed by the first vessel by modifying a next path to deviate at portion P-A. After the mammal exits the detection range 572 of the first vessel, the first vessel returns to its original path P while continuously shooting its seismic source. In another embodiment, the new path P' is calculated as described, for example, in EP patent application no. 15305330.1, the entire content of which is incorporated herein by reference. Any other method may be used for calculating the new path P'.

The first and/or second PAM systems may have the capability to track and locate the mammal in real-time and thus, the new path P' for the first vessel may be calculated and/or modified in real-time based on the current position of the mammal. In other words, if the mammal's trajectory appears to intersect the exclusion zone of the first vessel at a certain time t1, and a decision is made to modify first vessel's path P to a new path P' as illustrated in FIG. 5C, it is still possible at a later time t2, if the mammal's trajectory has changed to not intersect the exclusion zone, to modify path P' to return to original path P. There is no time limit imposed on the time interval t2-t1 for correcting the new path P', i.e., adjustment of path P' can be made as soon as the mammal's trajectory clears the exclusion zone. In this way, the deviation of the first vessel from the original path P' is kept at a minimum, and sometimes even eliminated.

Figure 6:
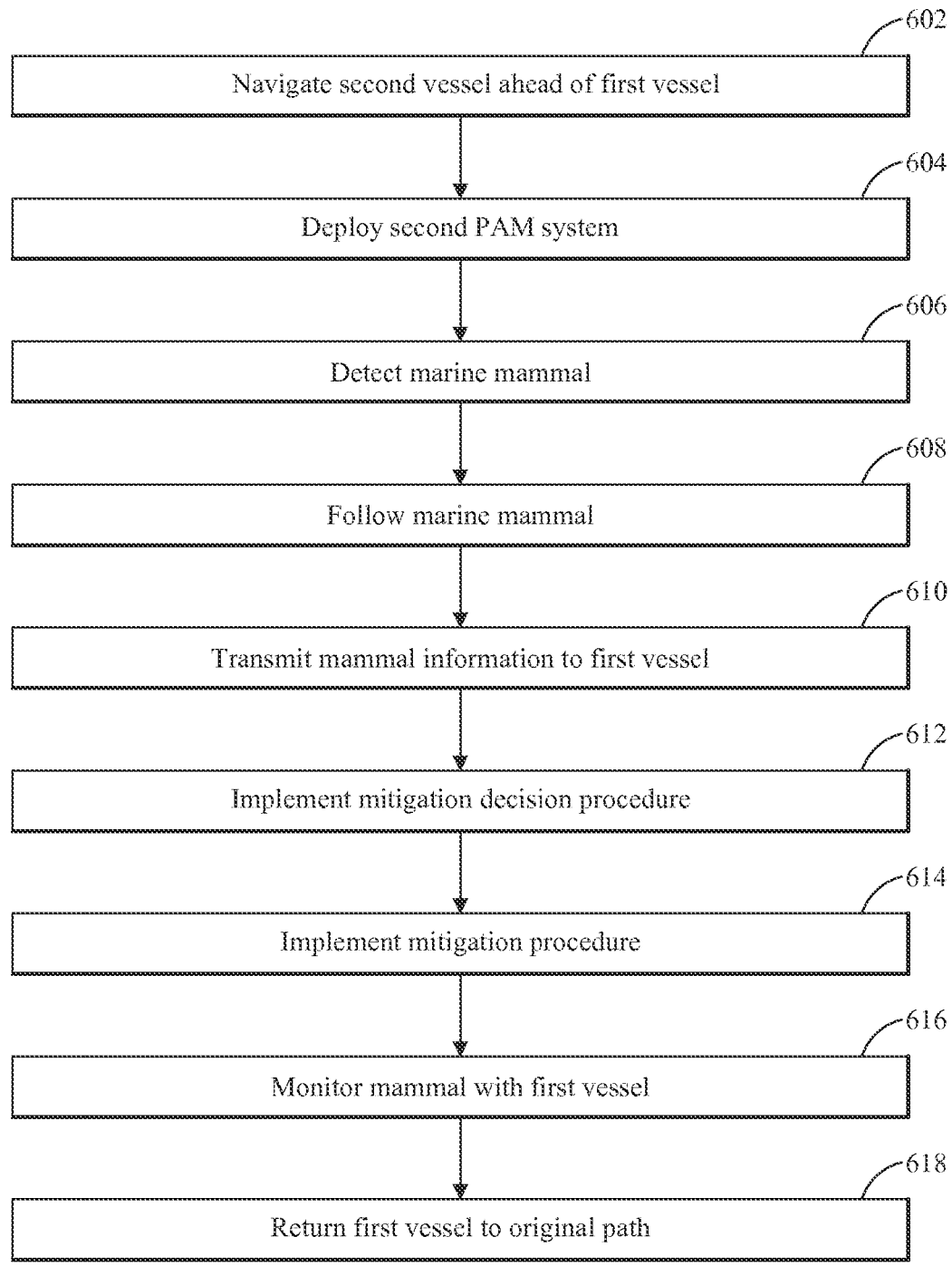
FIG. 6 if a flowchart of a method for monitoring marine mammals with two PAM systems.

A method for mitigating an intersection between the mammal's trajectory and first vessel's exclusion zone is now discussed with regard to FIG. 6. In step 602, the second vessel having the second PAM system is moving ahead (with a given inline offset) of the first vessel. Thus, the second vessel may follow the same pre-plot P as the first vessel of it may follow a different path (e.g., parallel to the path P). As discussed above, the second vessel may be between minutes and hours ahead of the first vessel. The cross-line offset between the two vessels may be between zero and a given number, for example, the radius of the detection zone of the second PAM system. Further, the second vessel may perform any other function associated with a seismic survey, for example, protecting the first vessel, clearing the survey area from fisherman, etc.

In step 604, the second PAM system is deployed at sea. In this regard, note that the second PAM system may include one or more towed antennas (e.g., a cable having sensors that is shorter than the traditional seismic streamers towed by the first vessel) that include plural sensors. The sensors may be hydrophones, accelerometers, etc. The antenna is coupled to a processing unit installed onboard the second vessel. The processing unit processes the signals sensed by the hydrophones and detects and localizes any vocalizing marine mammal in the range of detection of the second PAM system. The second PAM system may also include a tracking functionality, which will locate the mammal's swimming path in time, in order to be able to predict a swimming azimuth or trajectory. In one embodiment, the second PAM system also classifies the marine mammal so as to have the possibility to mitigate differently according to the present species. For example, sounds to be emitted by the first and/or second PAM systems for deterring the mammals to approach the exclusive zone may be emitted in different frequency ranges, depending on the type of mammal.

The second PAM system can transmit detection, localization, tracking, and classification information to the first PAM system. Preferably, the first PAM system of the first vessel can communicate with the second PAM system so as to remotely display and control the second PAM system. In other words, in one application, the first PAM system acts as a master and the second PAM system acts as a slave and the second PAM system is operated by the first PAM system instead of the operator of the second vessel. If this configuration is employed, the second vessel may be a pilotless vessel that is completely controlled from the first vessel.

In step 606, the second PAM system detects, and possibly locates, and possibly tracks marine mammals around the pre-plot path P, which should be sailed by the first vessel. After a marine mammal is detected in step 606, the second vessel deviates in step 608 from its path and starts following the mammal. In step 610, the second PAM system transmits mammal related information (e.g., position, calculated trajectory, type of mammal, etc.) to the first PAM system located onboard the first vessel.

In step 612 a decision is made of whether to implement a mitigation technique, in particular, deviating the first vessel from its given path in the side opposite to the marine mammal. Details about this step are discussed later. If the decision is made to take action to prevent the mammal entering the exclusion zone of the first vessel, a mitigation procedure is implemented in step 614. An example of a mitigation procedure may include deviating the first vessel from its pre-plot P to a new path P' as discussed above. Another mitigation procedure may be stopping the shooting of the seismic source. Still another mitigation procedure may be emitting sound waves to deter the mammal. A combination of these and other procedures may be implemented in this step.

In step 616, the first PAM system attached to the first vessel takes over monitoring the detected marine mammal. Once the marine mammal is past the exclusion zone or its direction is away from the exclusion zone, the first vessel is returned back to its original pre-plot path P in step 618. During all these steps, the seismic source may be shot continuously, because the exclusion zone of the first vessel is moved to not intersect the mammal's trajectory.

The above steps may be implemented, as now discussed, in corresponding computing systems of the first and second vessels. The computing systems may be the PAM software, the Integrated Navigation System of each vessel, the Seismic Processing System, or any other system located on board of one or both vessels. Any one of these systems is referred herein to as a controller.

Figure 7:
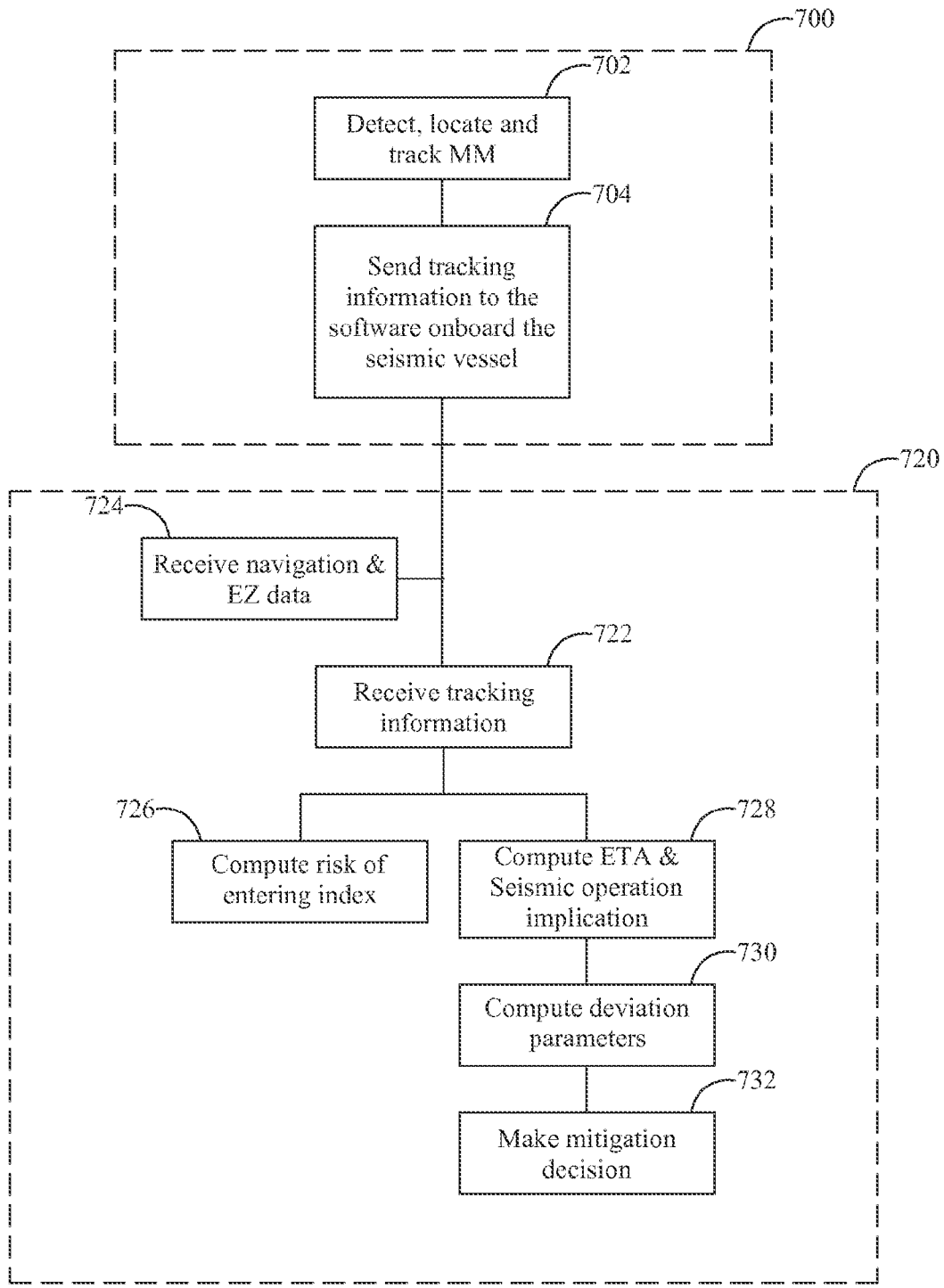
FIG. 7 is a schematic diagram of two PAM systems distributed over two vessels.

FIG. 7 shows one possible distribution of the functions associated with the method described in FIG. 6. These functions are hosted in this embodiment by the PAM software 700 onboard the second vessel and the processing software 720 onboard the first vessel. More specifically, the PAM software 700 onboard the second vessel is responsible for the detection, location, and tracking of the marine mammals functions, which are embedded in module 702, and also for sending the information collected by module 702 to the first vessel, which function is embedded in module 704. Module 702 may be configured to provide range, bearing, swimming speed, localization points, and associated times for building the mammal's trajectory. The trajectory may be calculated on the second vessel or the first vessel. Module 704 may use a radio bandwidth for sending, with or without human interaction, the data collected and/or the calculated results, from module 702 to the first vessel.

Processing software 720 may host a variety of modules as now discussed. Those skilled in the art would understand that these modules may be implemented in software, or circuitry or a mixture of the two. Module 722 is configured to receive the information sent by module 704. Each of modules 722 and 704 may be a transceiver, i.e., a device that can emit and receive radio waves. Processing software 720 also includes module 724 for receiving navigation information about the first vessel, e.g., pre-plot path P, vessel speed, vessel azimuth, vessel position, seismic source position, outside conditions (e.g., temperature, wind, etc.), ocean currents, GPS time, etc. In addition, module 724 may receive information regarding specific regulations in a given geographical location, e.g., exclusion zone radius for the surveyed area.

Based on the information received from modules 722 and 724, a risk module 726 computes a risk index of a detected marine mammal entering the exclusion zone associated with the first vessel. The risk module 726 may calculate the risk index based on at least the following information. First, the mammal's trajectory is calculated based on tracking information from module 702, and navigation and exclusion zone data from module 724. The risk module checks any intersection point between the computed mammal's trajectory and the exclusion zone according to the sailing path. The mammal's trajectory can be modeled based on mathematical techniques as, for example, least square, mean, etc.

A resulting index could be 1 if the mammal is found to enter the exclusion zone, or 0, for non-entering. In another embodiment, based on this trajectory and the mammal's successive location points, the processing software could also compute an area where the marine mammal will be probably swimming in future and check the overlapping of this area with the exclusion zone. In one application, a statistical analysis could provide a risk index based, for instance, on considering the location points as a normal distribution of the trajectory. At a given time, the marine mammal presence could be expressed as a mean and a deviation of these points. In one application, it is possible to compute the statistical probability of having the marine mammal within the exclusion zone.

A second factor is the behavioral information associated with the marine mammal. This information results from statistical analysis of former observations. For instance, a detected marine mammal swims parallel to the vessel in 50% of the observations, towards the vessel in 10% of the observations, away from the vessel in 30% of the observations, and with no trajectory change in 10% of the observations. These numbers are exemplary and can change from a species to another. For this reason, identifying the type of marine mammal that swims toward the first vessel may be important and this information may be estimated by module 702.

The two aspects discussed above could be combined for evaluating the risk index, for example, the results of these two lines of reasoning may be multiplied. Module 726 or another module 728 may then calculate an estimated time of arrival of the mammal at the exclusion zone and estimate a time when the first vessel should abandon the pre-plot path P and follow a new path P'. The module may also estimate the impact of this departure from path P on the seismic operation, e.g., which part P-A of path P will not be shot, so that a later path of the first seismic vessel will be adjusted to shot part P-A. Another module 730 may compute the deviation parameters from pre-plot path P to new path P', based on the mammal's estimated time of arrival, the first vessel's current position, its path P and various characteristics of the seismic survey, e.g., weight of the first vessel, engine capacity, maximum speed, streamer maximum or minimum speed, length of streamers, ocean currents, other pre-plot paths of the seismic survey. Module 730 may also be programmed to estimate the cost of skipping a portion of path P. Module 732 presents (e.g., displays) all this information to the PAM operator, who ultimately decides to implement the mitigation, e.g., deviate the first vessel, or not.

Figure 8:
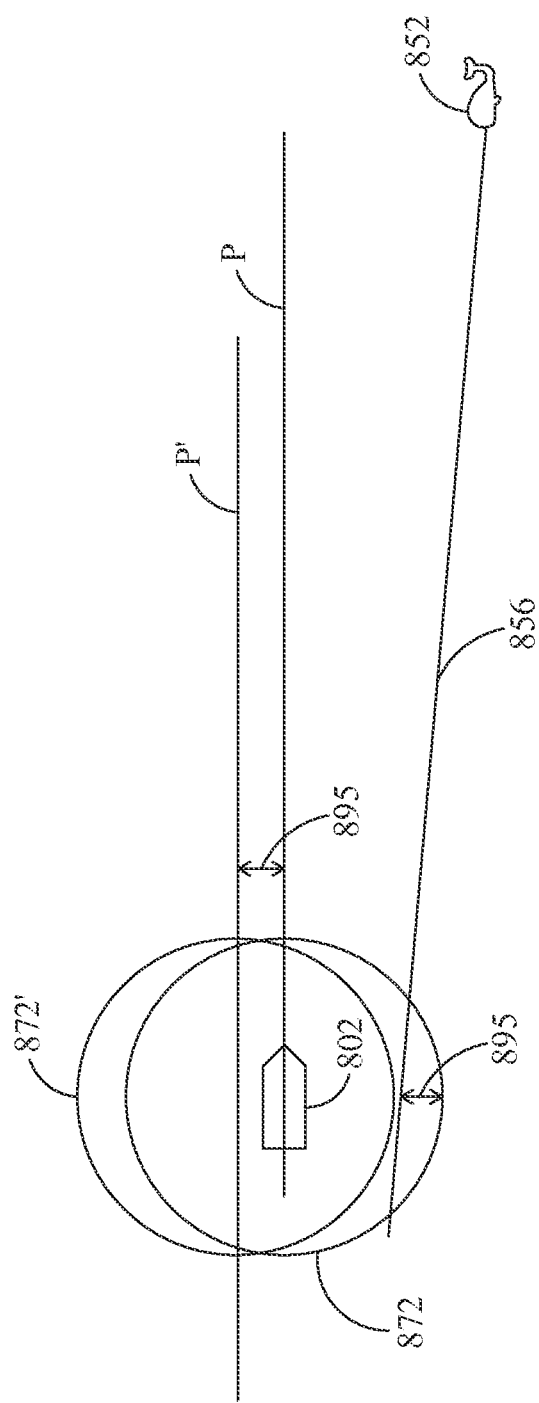
FIG. 8 illustrates how a first vessel changes its path, based on information supplied by a second PAM system, to avoid its exclusion zone intersecting with a marine mammal's trajectory.

In one embodiment, the deviation parameters calculated by module 730 describe an offset between path P and a parallel new path P'. For example, FIG. 8 shows the two paths P and P', the offset 895 calculated by module 730, and the exclusion zone 872 prior to deviation and exclusion zone 872' after deviation. The exclusion zone prior and after deviation are shown at the same inline position along the path P for illustrative purposes, but those skilled in the art would understand that exclusion zone 872' slowly moves away from exclusion zone 872 as vessel 802 changes its position from path P to new path P'. FIG. 8 shows that calculated/estimated trajectory 856 of mammal 852 is initially intersecting exclusion zone 872 and for this reason, a decision is made in module 732 to deviate the first vessel's path to P', which takes the new exclusion zone 872's at a position so that trajectory 856 does not intersect it.

Figure 9:
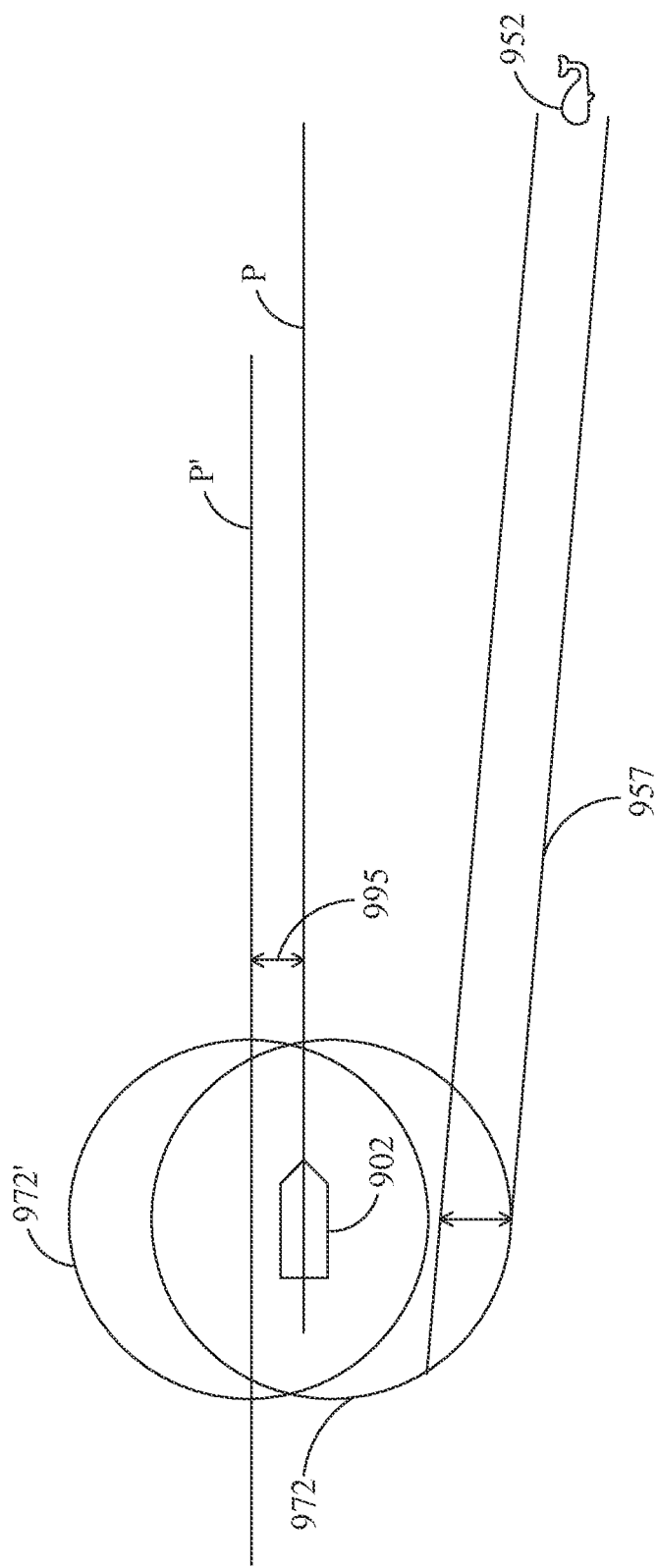
FIG. 9 illustrates how a first vessel changes its path, based on information supplied by a second PAM system, to avoid its exclusion zone intersecting with a marine mammal's set of possible trajectories.

A similar scenario is shown in the embodiment of FIG. 9 with the main difference that instead of calculating a trajectory 856 for mammal 852 as in FIG. 8, a range 957 for the mammal's trajectory is calculated and the exclusion zone 972 is moved to not intersect with the range of trajectories 957. The range of trajectories is calculated based on probabilities, similar for example, with the range of an anticipated hurricane. In this way, plural trajectories of the mammal are taken into account and the probability of avoiding an intersection between the mammal's trajectory and the first vessel's exclusion zone is further reduced. Note that in both FIGS. 8 and 9, the positions of the exclusion zones before and after deviation are plotted at the estimated time of arrival of the mammal.

Figure 10:
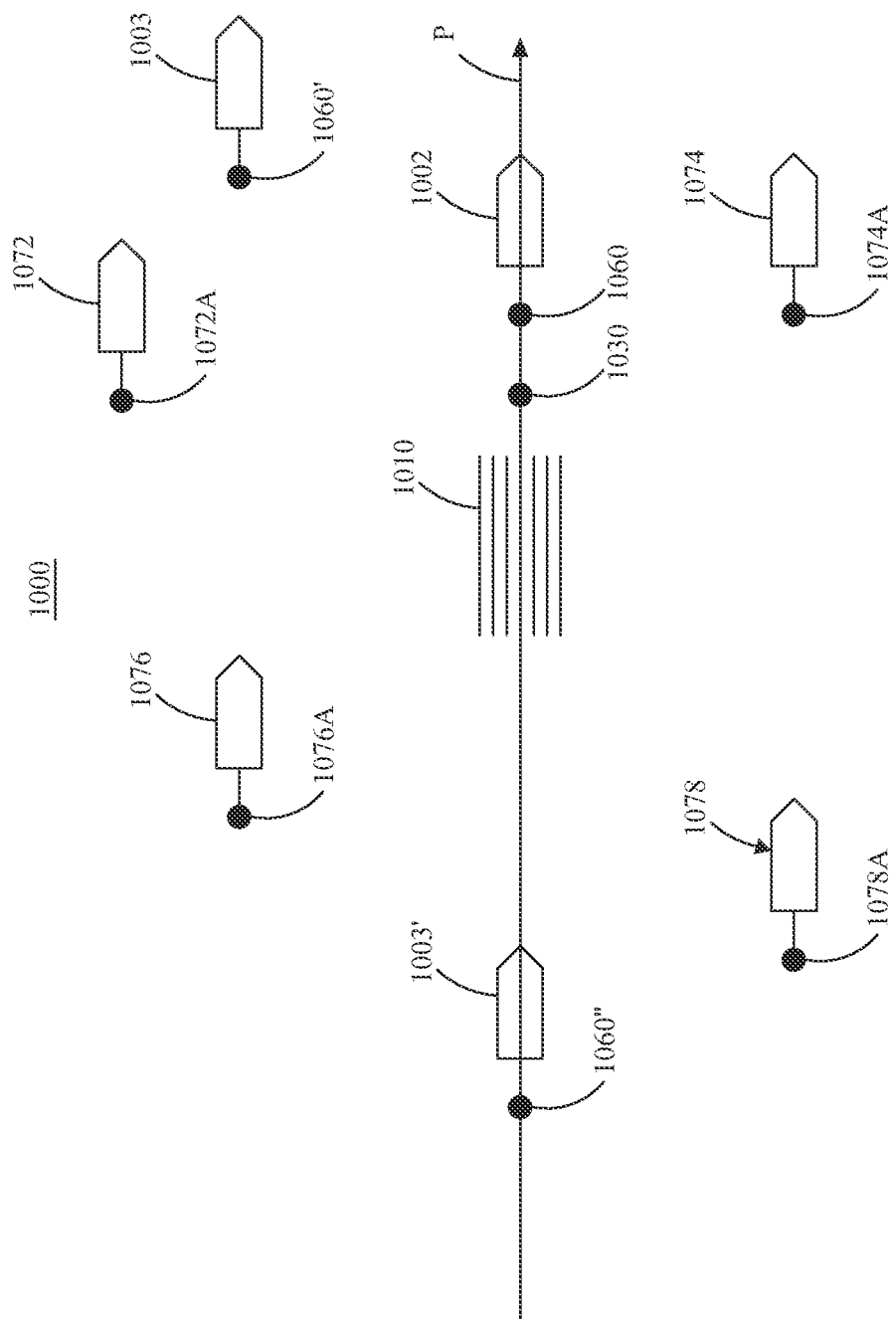
FIG. 10 illustrate a seismic acquisition system having at least two PAM systems.

While the above embodiments have been discussed for an acquisition system that includes a first vessel towing a source and streamers and a second vessel that has a PAM system, another embodiment illustrated in FIG. 10 shows a multi-vessel acquisition system 1000. Such system includes the first vessel 1002 towing a seismic source 1030, plural streamers 1010 and a first PAM system 1060, and other vessels 1072, 1074, 1076 and 1078 that can tow corresponding sources 1072A, 1074A, 1076A and 1078A, respectively, and, optionally, seismic streamers (not shown). The second vessel 1003 that tows second PAM system 1060' is shown advancing along a path parallel to main path P. In one embodiment, second vessel 1003 may be any of vessels 1072, 1074, 1076 and 1078. This means, that second vessel that tows second PAM system may also tow a source or it may be located behind first vessel 1002. In one embodiment, second vessel 1003 is located behind streamers 1010. In still another embodiment, there is a third vessel 1003' having a third PAM system 1060" that is located behind streamers 1010 and provides the same functionality as the second vessel, but for marine mammals that may approach the first vessel from behind the streamers.

Figure 11:
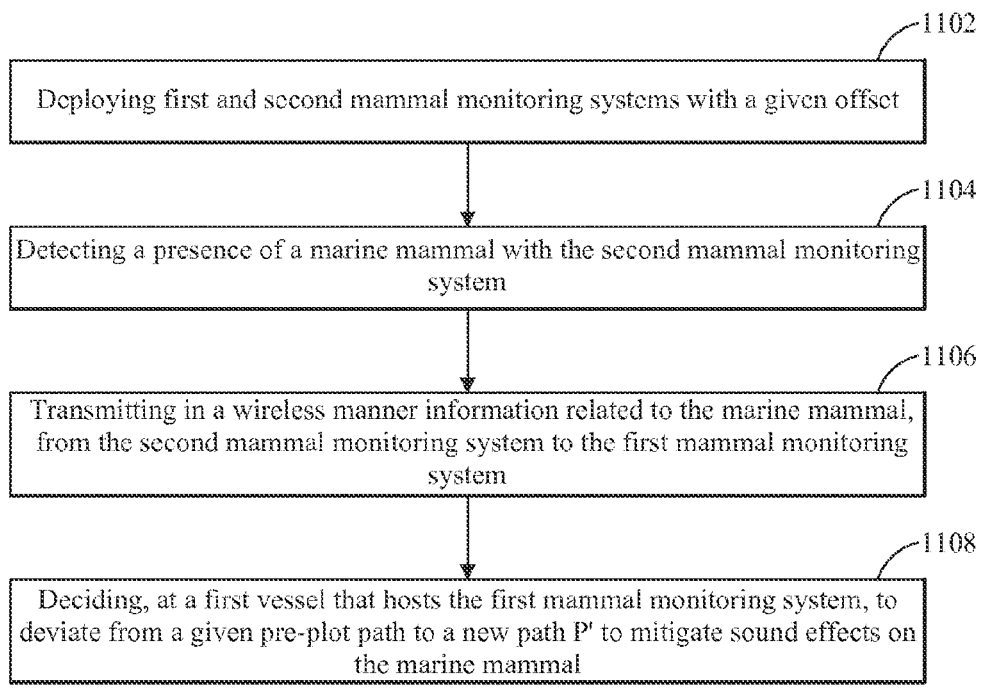
FIG. 11 is a flowchart of a method for using two PAM systems.

According to an embodiment illustrated in FIG. 11, there is a method for detecting marine mammals and mitigating the effects of sound waves on them. The method includes a step 1102 of deploying first and second mammal monitoring systems (360, 360') with a given offset; a step 1104 of detecting a presence of a marine mammal with the second mammal monitoring system (360'); a step 1106 of transmitting in a wireless manner information related to the marine mammal, from the second mammal monitoring system (360') to the first mammal monitoring system (360); and a step 1108 of deciding, at a first vessel (302) that hosts the first mammal monitoring system (360), to deviate from a given pre-plot path P to a new path P' to mitigate sound effects on the marine mammal.

Figure 12:
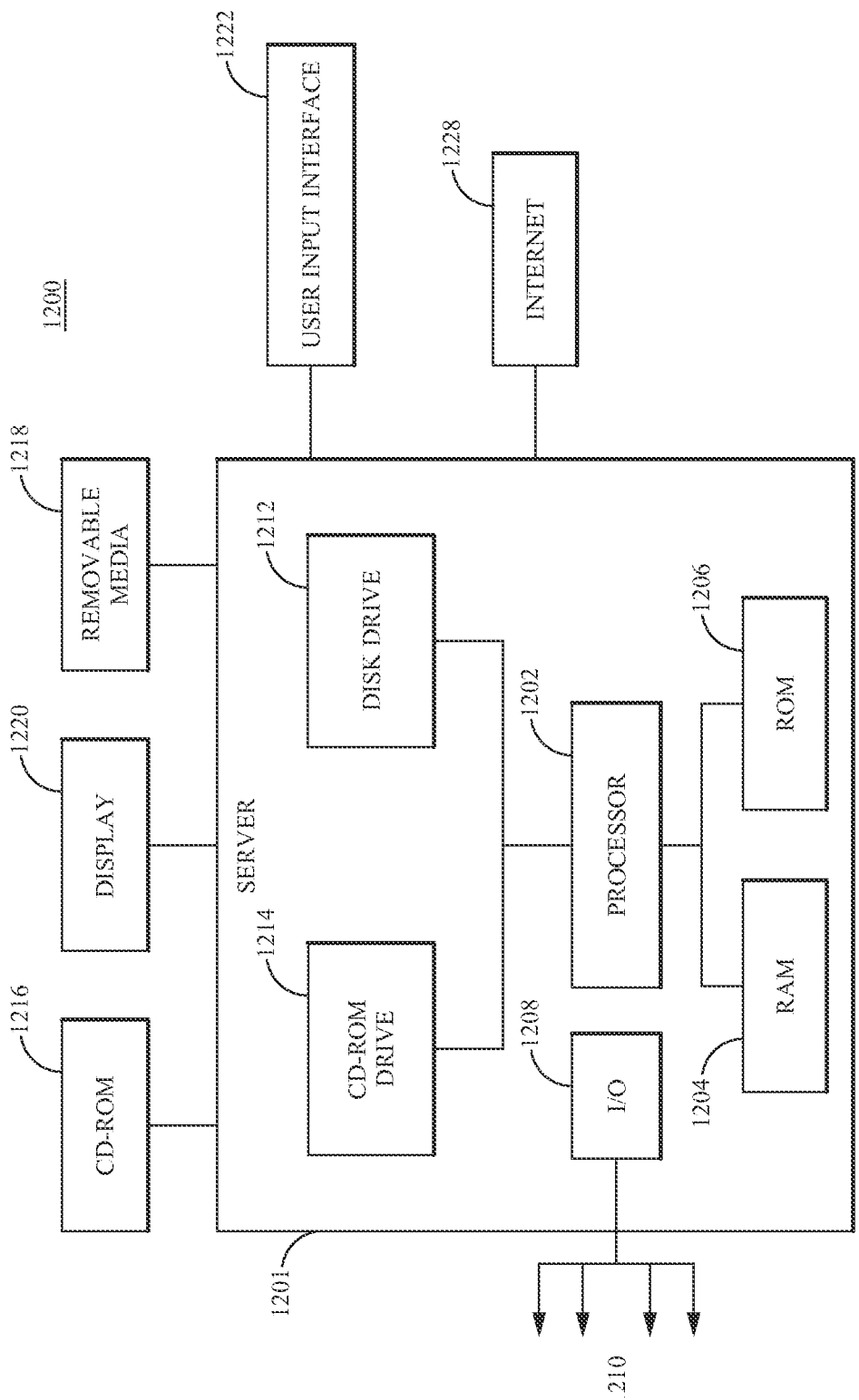
FIG. 12 is a schematic diagram of a computing device that implements a method that uses two PAM systems.

The above method and others may be implemented in a computing system specifically configured for seismic acquisition. An example of a representative computing system capable of carrying out operations in accordance with the exemplary embodiments is illustrated in FIG. 12. This computing system may be associated with any of the modules illustrated in FIG. 7. In one embodiment, a single computing system hosts all those modules while in another embodiment, each module is hosted in a corresponding computing system. Hardware, firmware, software or a combination thereof may be used to perform the various steps and operations described herein.

The exemplary computing system 1200 suitable for performing the activities described in the exemplary embodiments may include a server 1001. Such a server 1201 may include a central processor (CPU) 1202 coupled to a random access memory (RAM) 1204 and to a read-only memory (ROM) 1206. The ROM 1206 may also be other types of storage media to store programs, such as programmable ROM (PROM), erasable PROM (EPROM), etc. The processor 1202 may communicate with other internal and external components through input/output (I/O) circuitry 1208 and bussing 1210, to provide control signals and the like. The processor 1202 carries out a variety of functions as are known in the art, as dictated by software and/or firmware instructions.

The server 1201 may also include one or more data storage devices, including a hard drive 1212, CD-ROM drives 1214, and other hardware capable of reading and/or storing information such as DVD, etc. In one embodiment, software for carrying out the above-discussed steps may be stored and distributed on a CD- or DVD-ROM 1216, removable memory device 1218 or other form of media capable of portably storing information. These storage media may be inserted into, and read by, devices such as the CD-ROM drive 1214, the disk drive 1212, etc. The server 1201 may be coupled to a display 1220, which may be any type of known display or presentation screen, such as LCD, LED displays, plasma displays, cathode ray tubes (CRT), etc. A user input interface 1222 is provided, including one or more user interface mechanisms such as a mouse, keyboard, microphone, touchpad, touch screen, voice-recognition system, etc.

The server 1201 may be coupled to other computing devices, such as landline and/or wireless terminals via a network. The server may be part of a larger network configuration as in a global area network (GAN) such as the Internet 1228, which allows ultimate connection to various landline and/or mobile client devices. The computing device may be implemented on a vehicle that performs a land seismic survey.

The disclosed exemplary embodiments provide a system and a method for detecting marine mammals and mitigating the impact of sound waves on them. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A mammal detecting and mitigating system comprising:
   a first mammal monitoring system; and
   a second mammal monitoring system,
   wherein the first and second mammal monitoring systems are configured to be deployed away from each other, and the first and second monitoring systems communicate to each other such that the first mammal monitoring system is informed about a presence of a marine mammal detected by the second mammal monitoring system, and
   wherein the first mammal monitoring system instructs the second mammal monitoring system to follow the marine mammal.

2. The system of claim 1, wherein the first and second mammal monitoring systems communicate in a wireless manner.

3. The system of claim 1, wherein the second mammal monitoring system detects the marine mammal and transmits a position of the mammal to the first mammal monitoring system.

4. The system of claim 1, wherein the first mammal monitoring system is hosted by a first vessel and the second mammal monitoring system is hosted by a second vessel and the first mammal monitoring system is configured to control deviation options of the first vessel, based on information received from the second mammal monitoring system.

5. The system of claim 1, wherein the first mammal monitoring system is configured to control an exclusion zone associated with a first vessel hosting the first mammal monitoring system and to mitigate an intersection of the exclusion zone with a trajectory of the mammal based on information transmitted from the second mammal monitoring system.

6. The system of claim 1, wherein the second mammal monitoring system calculates a trajectory of the mammal and transmits the trajectory to the first mammal monitoring system.

7. The system of claim 6, wherein the first mammal monitoring system estimates a risk index associated with an exclusion zone of a first vessel intersecting the trajectory of the mammal, the first vessel hosting the first mammal monitoring system.

8. The system of claim 7, wherein, when the risk index is high, the first vessel calculates a new path P' that avoids intersection of its exclusion zone with the trajectory of the mammal and follows the new path P' while continuing to shoot the seismic source.

9. The system of claim 8, wherein the first vessel re-calculates the new path P' based on additional information received from the second mammal monitoring system for returning back to a given pre-plot path P.

10. The system of claim 1, wherein a cross-line offset between a first vessel hosting the first mammal monitoring system and a second vessel hosting the second mammal monitoring system varies in time.

11. A seismic acquisition system with mammal detecting and mitigating capabilities, the system comprising:
a first vessel that tows a seismic source, plural seismic streamers, and a first mammal monitoring system; and
a second vessel that tows a second mammal monitoring system,
wherein the first vessel advances along a pre-plot path P, and the second vessel is offset by a predetermined distance along the pre-plot path P, and
wherein the first vessel instructs the second vessel to follow a mammal detected by the second mammal monitoring system.

12. The system of claim 11, wherein the second vessel is faster and lighter than the first vessel.

13. The system of claim 11, wherein the second mammal monitoring system communicates information about the mammal to the first mammal monitoring system.

14. The system of claim 11, wherein the second mammal monitoring system detects a mammal that moves toward the first vessel, determines a position of the mammal and transmits this information to the first vessel.

15. The system of claim 11, wherein the second mammal monitoring system calculates a trajectory of the mammal and transmits the trajectory to the first vessel, the first vessel estimates a risk index associated with an exclusion zone of the first vessel intersecting the trajectory of the mammal, and when the risk index is high, the first vessel calculates a new path P' that avoids an intersection of the exclusion zone with the trajectory of the mammal and follows the new path while continuing to shoot the seismic source.

16. A method for mammal detection and mitigation, the method comprising:
deploying first and second mammal monitoring systems with a given offset;
detecting a presence of a marine mammal with the second mammal monitoring system;
transmitting information related to the marine mammal, from the second mammal monitoring system to the first mammal monitoring system;
instructing the second mammal monitoring system to follow the marine mammal; and
deciding, at a first vessel that hosts the first mammal monitoring system, to deviate from a given pre-plot path P to a new path P' to mitigate sound effects on the marine mammal.

17. The method of claim 16, further comprising:
repeating the step of deciding periodically based on new information received from the second marine mammal monitoring system.

18. The method of claim 16, wherein the new path P' is calculated on board of the first vessel to ensure that an exclusion zone associated with a seismic source towed by the first vessel does not intersect with an estimated trajectory of the marine mammal.

19. The method of claim 18, further comprising:
re-calculating the new path P' based on additional information received from the second mammal monitoring system for returning the first vessel back to the given pre-plot path P.

* * * * *